United States Patent Office

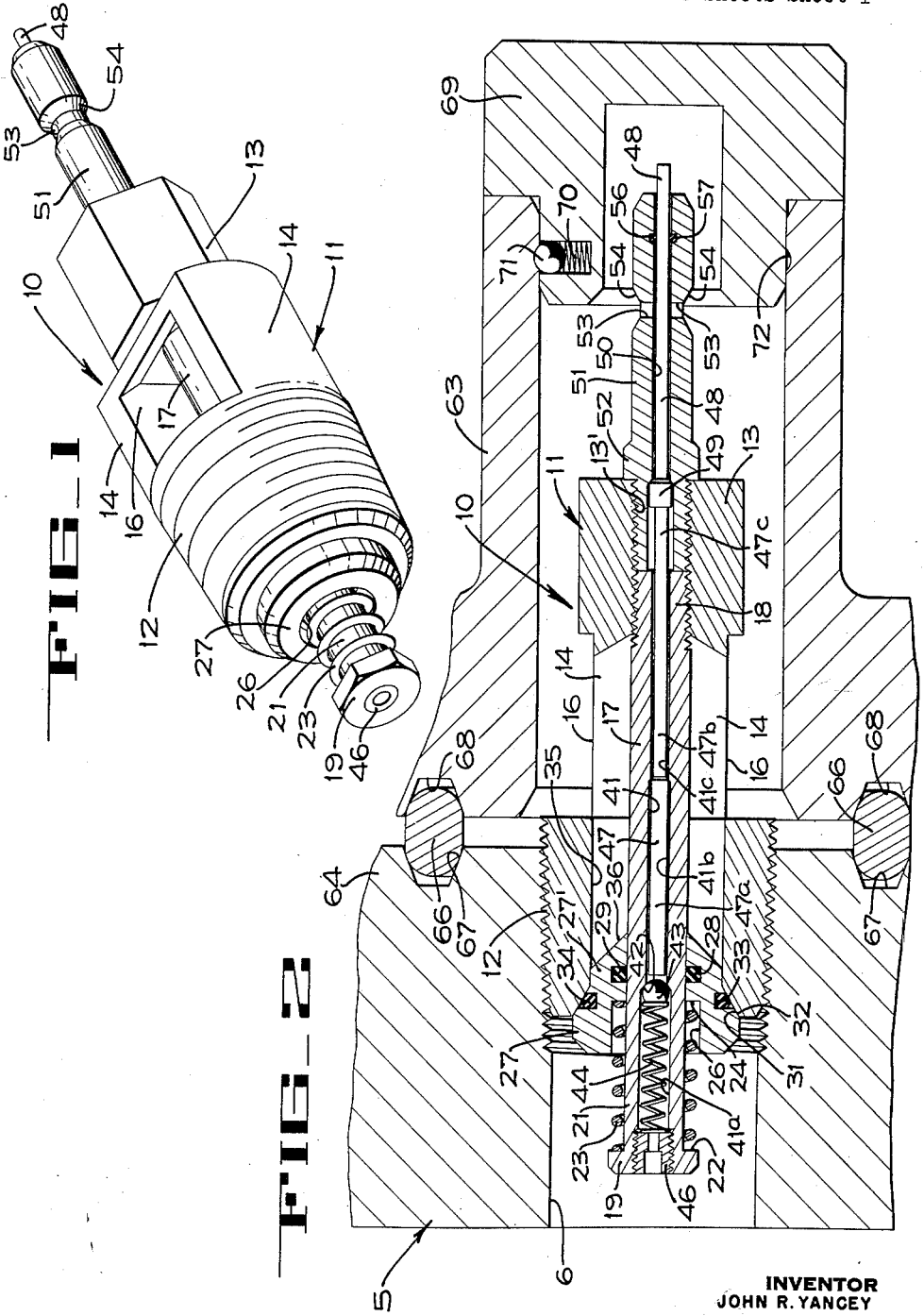

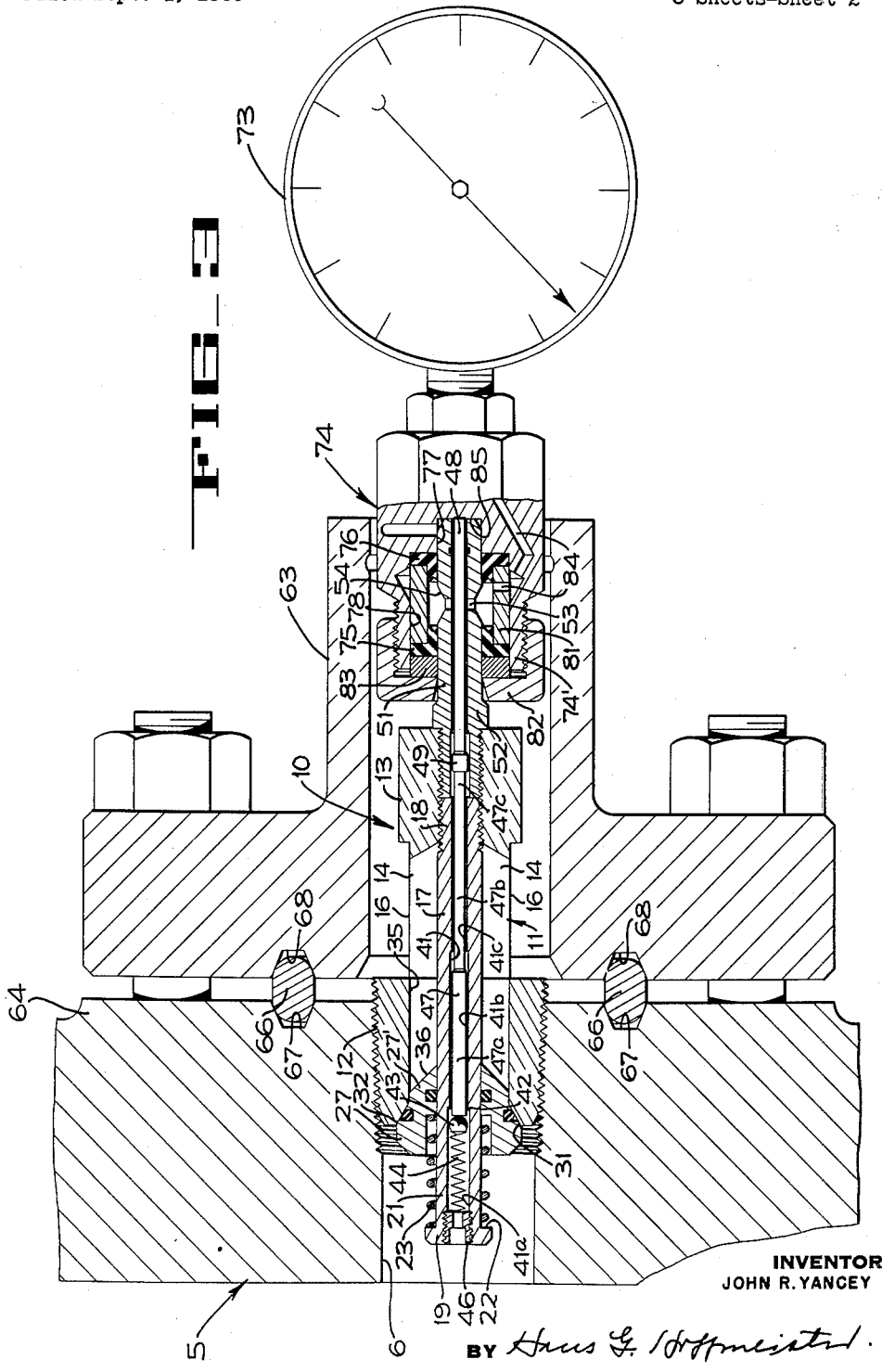

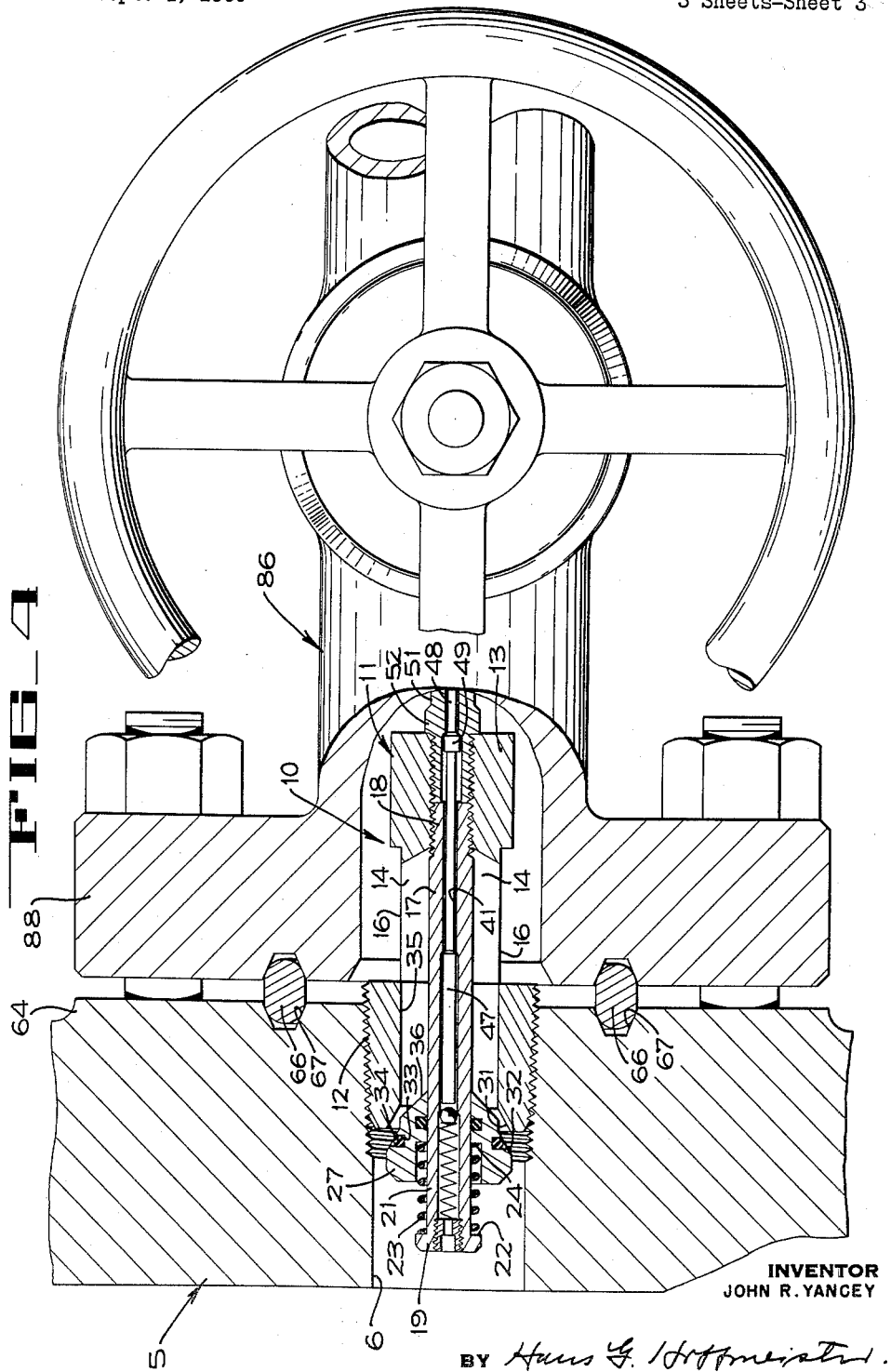

3,072,142
Patented Jan. 8, 1963

3,072,142
MULTI-PURPOSE PLUG VALVE
John R. Yancey, Houston, Tex., assignor, by mesne assignments, to FMC Corporation, San Jose, Calif., a corporation of Delaware
Filed Sept. 1, 1960, Ser. No. 53,497
5 Claims. (Cl. 137—512.1)

The present invention appertains to plug valves and more particularly relates to multi-purpose plug valves for use in wellhead assemblies or the like.

In many oil or gas well installations several strings of tubing and/or casing are supported individually by a wellhead assembly and define flow passages leading, respectively, from different levels of oil or gas bearing strata to the wellhead. The wellhead assembly is provided with a number of flanged and internally threaded ports each of which communicates with one of the passages defined between adjacent tubing or casing strings. These passages and the connecting ports may or may not contain fluid under pressure. In any case the pressure is checked at regular intervals in order to determine if a change has occurred. In certain instances it may be necessary to quickly pump mud or cement into the passages in order to kill the well or seal off a leak.

Heretofore, before the wellhead was put in use, a gate valve of conventional design was connected to each of the flanged ports. When the wellhead was later placed in operation the gate valve was used to control the flow of fluid through the associated port. When it was desired to remove or replace one of the gate valves, a complicated plug inserting and pressure controlling tool was first connected to the outlet flange of the gate valve. With the tool connected to the gate valve in this way, the gate valve was opened without loss of pressure from the port. A plug was then inserted, by means of the tool, through the open gate valve and screwed into fluid tight engagement into the threaded port. If at some later date it was desired to establish flow through the port, the plug was removed in a complicated procedure which required the reassembly of the gate valve and the plug inserting and pressure controlling tool into operative relation with the port.

It is, therefore, one object of the present invention to provide an improved plug valve for use in conjunction with a conventional wellhead assembly.

Another object is to provide an improved plug valve adapted for connection to a wellhead port and to permit easy and rapid checking of the pressure within the port and the passage associated therewith.

Another object is to provide an improved plug valve arranged for insertion in a wellhead port to prevent flow of pressurized fluid out a port in a wellhead structure to which the plug valve is attached and, at the same time, to permit fluid at a higher pressure to be forced past the plug valve into the port.

These and other objects and advantages of the present invention will become apparent from the following description and the drawings, in which:

FIG. 1 is a perspective of the improved plug valve of the present invention.

FIG. 2 is a central section of the plug valve of FIG. 1 assembled in a port of a wellhead assembly and having a protective cover therearound, the wellhead assembly being fragmentarily shown.

FIG. 3 is another central section of the plug valve of FIG. 1, but drawn to a reduced scale and having the protective cover replaced by a pressure gage.

FIG. 4 is a central section similar to FIG. 3 with the pressure gage replaced by a conventional control valve shown partly in elevation.

FIG. 2 illustrates a part of a wellhead assembly 5 which is provided with a port 6 that communicates with a flow passage defined by certain tubing and casing strings (not shown) normally associated with the wellhead assembly. Fluid under pressure is confined in the passage and tends to flow out of the wellhead assembly 5 through the port 6. The multi-purpose plug valve 10 of the present invention is connected to the port 6 and is selectively operable for controlling the flow of fluid therethrough, for checking the pressure within the port and for use in pumping fluid through the port 6 into the associated passage.

The plug valve 10 (FIGS. 1 and 2) comprises a body 11 having an externally threaded tubular spigot 12 which is connected to a hexagonal head 13 by a pair of spaced arms 14 which cooperate with each other to define apertures 16 opening exteriorly of the body 11 and opening into the bore of the tubular spigot. A tubular valve stem 17 having an externally threaded inner end portion 18 is screwed into one end of an internally threaded bore 13' extending axially through the head 13. The valve stem 17 projects from the head 13, centrally through the tubular spigot 12, and beyond the end thereof.

A hexagonal flange 19 on the outer end 21 of the valve stem 17 presents a shoulder 22 against which one end of a helical compression spring 23 bears. The other end of the spring 23 bears against a shoulder 24 (FIG. 2) which defines the bottom of a counterbore 26 drilled into one end of an annular valve head 27 which is slidable on the valve stem 17 adjacent the outer end 21 thereof. An O-ring 28 is disposed in an annular groove 29 in the inner surface of the valve head 27 to provide a fluid tight seal between the valve head 27 and the valve stem 17 projecting therethrough.

The end surface of the spigot 12 is of concave form to provide a frusto-conical valve seat 31 adapted to mate with a complementary frusto-conical surface 32 on the valve head 27. An annular slot 33 in the surface 32 has therein an O-ring 34, which when the valve head 27 is in the position shown in FIG. 2, provides a fluid tight seal between the valve head 27 and the spigot 12. The valve head 27 has a portion 27' of reduced diameter which enters into the bore 35 of the spigot 12, and has a forward frusto-conical fluid guiding surface 36 disposed within the spigot bore 35 (FIG. 2). The spring 23 urges the valve head 27 to the right as viewed in FIG. 2, to move the frusto-conical surface 32 into sealing engagement against the frusto-conical valve seat 31. When the fluid is to be pumped into the port 6, this fluid acts on the right side (FIG. 2) of the valve head 27 and must be under sufficiently higher pressure to unseat the valve head 27 against pressure exerted by the fluid within the port 6 and that exerted by the spring 23 acting on the left side (FIG. 2) of the valve head 27. This higher fluid pressure will move the valve head 27 away from the seat 31, as shown in FIG. 4, allowing fluid to flow from the bore 35 into the port 6.

The tubular valve stem 17 has a stepped bore 41 therein which includes a large diameter portion 41a opening through the flange 19, an intermediate portion 41b of lesser diameter, and a small diameter portion 41c opening through the inner end portion 18. A frusto-conical ball seat 42 is defined at the junction of the portions 41a and 41b. A second valve head in the form of a ball 43 is urged against the ball seat 42 by a spring 44 which is under compression between the ball 43 and an apertured bushing 46 screwed into the outer end of the large diameter portion 41a of the bore. Fluid under pressure can enter the large diameter portion 41a of the bore through the apertured bushing 46 but will not flow past the ball 43 due to the sealing engagement of the ball 43 against the ball seat 42 which is normally effected by the spring 44. This arrangement defines a check valve which normally prevents fluid flow through the bore section 41b and 41c to the right (FIG. 2).

In order to make it possible to move the ball 43 away from the ball seat 42 and allow fluid to enter bore section 41b and 41c through the large diameter bore portion 41a, a rod 47 is provided. The rod 47 includes a large diameter portion 47a loosely fitted into the intermediate portion 41b of the bore 41 and a small diameter portion 47b which is loosely fitted into the small diameter portion 41c of the bore 41. One end portion 47c of the rod 47 projects through and beyond the inner end portion 18 of the body 11. A second rod 48 is connected at its inner end by a coupling 49 to the projecting end portion 47c of the rod 47.

The rod 48 is loosely fitted within and has its outer end projecting beyond the bore 50 of a tubular pressure gage receiving spigot or nipple 51. The spigot 51 is threaded at one end and is screwed into the hexagonal head 13 in axial alignment and in abutting engagement with the valve stem 17 so that the bore 50 and the bore 41 are brought into coaxial alignment. An enlarged hexagonal portion 52 is formed on the spigot 51 intermediate its ends so that the spigot may be screwed into the bore 13' by a suitable tool or wrench until the portion 52 is in tightly abutting relation against the head 13, as shown in FIG. 2. The spigot 51 is also provided with radial passageways 53, each passageway opening at one end through an annular groove 54 formed in the outer surface of the spigot 51 and opening at the opposite end into the bore 50.

Fitted around the rod 48 is an O-ring 56 disposed in an annular groove 57 formed in the bore 50 between the passageways 53 and the end of the spigot 51 remote from the collar 13. By moving the outer end of the rod 48 and the connected rod 47 toward the left (FIG. 2), the ball 43 will be displaced from its seat 42 and allow fluid to flow from the large diameter portion 41a of the bore 41 past the ball 43, through the bores 41 and 50, and out through the passageways 53.

As already pointed out, the multi-purpose plug valve 10 is used in conjunction with the wellhead assembly 5 to prevent flow of fluid out of the port 6, to check the pressure of fluid within the port 6, and to allow fluid to be pumped into the port 6 without requiring that the valve 10 be removed. The plug valve 10 is mounted on the wellhead assembly by screwing the threaded spigot 12 into the threaded port 6. This may be done before the wellhead 5 is put into operation and the plug valve may remain thus mounted in the port throughout the period of operation of the wellhead 5.

Since a considerable portion of the plug valve 10 projects outwardly of the port 6 and is thus subject to accidental damage, a cylindrical, flanged protective housing 63 (FIGS. 2 and 3) is disposed in surrounding relation to the exposed portion of plug valve 10 and is bolted to a flange 64 of the wellhead structure around the port 6. A conventional seal ring 66 is disposed in mating grooves 67 and 68 formed in the flange 64 and the flanged housing 63, respectively. To close the outer end of the housing 63 an end cap 69 (FIG. 2) is inserted into the open outer end of the housing and is releasably held in place by a ball detent 71 which is yieldably seated in an annular groove 72 in the housing 63 by a compression spring 70.

When the parts of the plug valve 10 are positioned as shown in FIG. 2, the valve 10 is protected against accidental damage and fluid in the port 6 is prevented from flowing out of the port by the check valve defined by the ball 43 and its seat 42 and by the O-rings 28 and 34.

When it is desired to check the fluid pressure within the port 6 and the passage (not shown) associated therewith, the end cap 69 (FIG. 2) is removed and a housing 74 (FIG. 3) having a suitable pressure gage 73 connected thereto is slid onto the spigot 51 so that the groove 54 and the radial passageways 53 are disposed between axially spaced resilient seal rings 75 and 76 which are provided within the housing 74. The other end of the housing 74 is externally threaded and is provided with an axial bore 77 adapted to receive the distal end of the spigot 51. Said other end of the housing 74 is also provided with a large counterbore 78 within which the above-mentioned pair of resilient seal rings 75 and 76 are mounted and are held in spaced apart relation by a rigid spacer tube 81. The seal rings 75 and 76 are locked in place by an apertured cap 82 screwed onto the external threads of the end 74' of the housing 74 and by a spacer ring 83 disposed between the cap 82 and the seal ring 75. A passageway 84 formed in the housing 74 and in the spacer tube 81 establishes communication between the space between the resilient seal rings 75 and 76 and the pressure gauge 73.

When the housing 74 is moved onto the spigot 51 into the pressure checking position, the end wall 85 of the bore 77 contacts the end of the rod 48 and moves the rod 48, the rod 47, and the ball 43 to the left (FIG. 3) thereby permitting fluid to flow from the port 6 through the several passages to the pressure gauge 73, thus permitting ascertainment of the pressure of the fluid within the port 6 and the associated passage within the wellhead.

In order to pump additional fluid into the port 6, the protective housing 63 must be removed from the wellhead 5. This permits a flanged control valve 86 (FIG. 4) of conventional design to be secured to the wellhead assembly 5 in place of the housing 63 is indicated in FIG. 4. The seal ring 66 is again employed to provide a fluid tight seal between the flange 88 of the control valve 86 and the wellhead assembly 5. A supply conduit (not shown) is connected to the valve 86 and to a source of fluid which is under a pressure sufficiently high to unseat the valve head 27 against the combined pressure of fluid within the port 6 plus the pressure exerted by the spring 23 against the valve head 27. Thereafter, when the valve 86 is opened, fluid flows through the valve 86, through the space between the frusto-conical valve seat 31 and the frusto-conical surface 32 of the valve 27, and into the port 6.

When flow of fluid into the port is no longer desired, the valve 86 is disconnected from the supply conduit and is removed from the wellhead assembly 5. The pressure within the port 6 and the action of the spring 23 forces the valve head 27 to return to fluid sealing position against the frusto-conical valve seat 31. The protective housing 63 (FIG. 2) is then re-mounted on the wellhead assembly 5 and either the end cap 69 or the pressure gage re-installed, as circumstances require.

From the foregoing description it is apparent that the multi-purpose plug valve of the present invention serves to connect a pressure gauge to the wellhead 5 for checking the fluid pressure within the port 6. If necessary a valve 86 can be secured to the wellhead with the plug valve disposed therein for the purpose of connecting the port 6 to a source of fluid under pressure higher than that within the port 6, and when the valve 86 is opened, fluid will flow therefrom through the plug valve 10 and into the port 6. When the plug valve is not being used in either of these ways, it serves as a simple plug to prevent escape of the pressurized fluid within the port 6 and when the plug valve is thus functioning the cover 63 and cap 69 should be mounted in operative relation thereto to protect the plug valve against accidental damage.

While a particular embodiment of the present invention has been shown and described, it will be understood that various changes and modifications may be made therein without departing from the spirit of the invention or the scope of the appended claims.

Having thus described the invention and the manner in which the same is to be used, what is claimed as new and desired to be protected by Letters Patent is:

1. A plug valve comprising a body having a bore therein and a valve seat encircling said bore, a valve stem secured to said body in concentric relation with said bore, a valve head slidable on said stem and adapted to be moved into a position in engagement with said valve seat and to a fluid flow position displaced from said valve seat, resilient means interposed between said valve head and said stem and urging said valve head against said valve seat, said valve stem being tubular and having a valve seat within its bore, a second valve mounted within the bore of the valve stem for movement into and out of engagement with the seat therewith, and resilient means acting between the valve stem and said second valve to urge said second valve against the seat in said valve stem bore.

2. A plug valve comprising a body having a bore therein and a valve seat encircling the bore, a tubular valve stem secured to said body within said bore, a valve head slidable on said stem and adapted to be moved between a fluid sealing position against said valve seat and a fluid flow position spaced from said valve seat, resilient means acting between said valve head and said stem to urge said valve head toward said valve seat, said valve stem having a stepped passageway axially therethrough including a large diameter portion and a small diameter portion, a ball valve seat at the junction of said large diameter portion and said small diameter portions of said passageway, a ball valve within said large diameter portion and arranged to cooperate with said ball valve seat, a bushing secured to said valve stem within said large diameter portion of said bore thereof, said bushing having an aperture therein to allow flow of fluid therethrough, and resilieint means interposed between said bushing and said ball valve and urging said ball valve against said ball valve seat to prevent the flow of fluid therethrough.

3. A plug valve comprising a body including a tubular spigot, a head having a threaded bore, and means rigidly connecting the head to the tubular spigot, said connecting means having an aperture therein opening externally of the plug valve and opening into the bore of the tubular spigot, a tubular valve stem screwed into said threaded bore of the head and projecting therefrom through the bore of said tubular spigot, a flange on said valve stem spaced beyond the body from said head, a valve head slidable on said stem and adapted to be moved between a flow preventing position in sealing engagement against said tubular spigot and a flow permitting position spaced from said tubular spigot, and a spring under compression between said flange and said valve head and urging said valve head toward said spigot, said valve being adapted to be moved out of sealing engagement with said tubular spigot by fluid introduced into said tubular spigot through the aperture in said connecting means, said tubular valve stem having a stepped passageway axially therethrough including a large diameter portion and a small diameter portion, a ball valve seat at the juncture of said portions of said passageway, a ball valve within said large diameter portion, a tubular bushing fixed within said large diameter portion, and resilient means interposed between said bushing and said ball valve to urge said ball valve against its seat.

4. A multi-purpose plug valve for use in connection with a port containing fluid under pressure, said plug valve comprising a body including a tubular portion adapted to be mounted in said port and having a first valve seat adjacent one end of the tubular portion, said body having a transverse flow passage adjacent the other end of said tubular portion, a tubular valve stem connected to said body and projecting through said tubular portion thereof, a first valve head slidable on said valve stem and adapted to be moved into and out of engagement with said valve seat, a first resilient means supported by said valve stem for urging said valve head against said valve seat, a tubular gauge engaging nipple secured to and projecting from said body, the bore of said tubular nipple being in coaxial alignment with the bore of said tubular stem, said nipple having a flow passage therein in communication with its bore, a second valve seat within said tubular valve stem, a second valve head disposed within said tubular valve stem and movable into and out of engagement with said second valve seat, a second resilient means supported by said valve stem for urging said second valve into engagement with said second valve seat, rod means loosely received in the bore of said tubular valve stem and in the bore of said nipple and having one end projecting outwardly of said nipple, the other end of said rod means being positioned to contact said second valve head to move the same off said second seat against the effect of said second resilient means upon movement of said rod means.

5. A plug valve to be inserted in the port of a well head assembly which connects to the casing annulus, comprising a tubular body having an externally threaded spigot on its inner end, an inwardly tapered first valve seat on the inner end of the spigot, a tubular valve stem fixed to and closing the outer end of the valve body and projecting inwardly beyond the inner end thereof, said valve body having ports therein surrounding said valve stem, a first valve slidably mounted on the stem and engaging said first seat, means normally biasing said first valve against said first seat, said valve being unseatable by pressure of fluid entering said ports in said valve body, a second valve seat formed within said tubular valve stem, a second valve seated against said second valve seat to prevent fluid flow through said tubular valve stem, means biasing said second valve against said second seat, and rod means for unseating said second valve, said rod means being slidably mounted in said tubular valve stem in contact with said second valve and projecting out of the outer end of said valve stem.

References Cited in the file of this patent

UNITED STATES PATENTS

| | | |
|---|---|---|
| 1,425,358 | Baer | Aug. 8, 1922 |
| 1,719,902 | Reaney | July 9, 1929 |
| 2,019,244 | Bergesen | Oct. 29, 1935 |
| 2,646,244 | Sohn | July 21, 1953 |
| 2,890,817 | Rheinstrom | June 16, 1959 |
| 2,961,131 | Bradbury | Nov. 22, 1960 |